United States Patent
Song (10) Patent No.: US 10,397,098 B2
(45) Date of Patent: Aug. 27, 2019

(54) ESTABLISHING INSTANCE IN SOFTWARE DEFINED NETWORK

(71) Applicant: Hewlett Packard Enterprise Development LP, Houston, TX (US)

(72) Inventor: Xiaoheng Song, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 71 days.

(21) Appl. No.: 15/317,565

(22) PCT Filed: May 29, 2015

(86) PCT No.: PCT/CN2015/080166
§ 371 (c)(1),
(2) Date: Dec. 9, 2016

(87) PCT Pub. No.: WO2015/188700
PCT Pub. Date: Dec. 17, 2015

(65) Prior Publication Data
US 2017/0104670 A1    Apr. 13, 2017

(30) Foreign Application Priority Data

Jun. 11, 2014  (CN) .......................... 2014 1 0257839

(51) Int. Cl.
| H04L 12/721 | (2013.01) |
| H04L 12/64 | (2006.01) |
| H04L 12/46 | (2006.01) |
| H04L 12/24 | (2006.01) |
| H04L 12/751 | (2013.01) |

(52) U.S. Cl.
CPC .......... H04L 45/38 (2013.01); H04L 12/4641 (2013.01); H04L 12/6418 (2013.01); H04L 41/12 (2013.01); H04L 45/02 (2013.01); Y02D 30/30 (2018.01)

(58) Field of Classification Search
None
See application file for complete search history.

(56) References Cited

U.S. PATENT DOCUMENTS

2015/0117451 A1*  4/2015  Kaneriya .............. H04L 45/745
                                                           370/392
2015/0244607 A1*  8/2015  Han ........................ H04L 45/02
                                                           370/254
2015/0341253 A1*  11/2015  Scheurich ........... H04L 41/0893
                                                           370/422

FOREIGN PATENT DOCUMENTS

| CN | 103001887 A | 3/2013 |
| CN | 103401786 A | 11/2013 |
| CN | 103428031 A | 12/2013 |

(Continued)

OTHER PUBLICATIONS

International Search Report and Written Opinion, International Application No. PCT/CN2015/080166, dated Sep. 1, 2015, pp. 1-11, SIPO.

(Continued)

*Primary Examiner* — Lonnie V Sweet
(74) *Attorney, Agent, or Firm* — Sheppard Mullin Richter & Hampton (57) ABSTRACT

A control device may manage a switch device within a same software defined network (SDN) of the control device, manage a topology structure of an SDN corresponding to the SDN instance managed by the control device, and calculate flow paths based on the topology structure.

12 Claims, 5 Drawing Sheets

(56) References Cited

FOREIGN PATENT DOCUMENTS

| | | |
|---|---|---|
| CN | 103746911 A | 4/2014 |
| CN | 103763146 A | 4/2014 |
| CN | 103782553 A | 5/2014 |
| CN | 103825825 A | 5/2014 |
| CN | 103634177 B | 8/2016 |
| WO | WO-2014/063605 A1 | 5/2014 |

OTHER PUBLICATIONS

Vlkan, "Discovery in Software-Defined Networks," Aug. 6, 2013, pp. 1-3.
International Preliminary Report on Patentability received for PCT Application No. PCT/CN2015/080166, dated Dec. 22, 2016, 6 pages.

* cited by examiner

| Chassis ID TLV | Port ID TLV | Time to Live TLV | Sdn Indentity TLV | End TLV |

ESTABLISHING INSTANCE IN SOFTWARE DEFINED NETWORK

BACKGROUND

Software defined network (SDN) is a type of network architecture in which the control plane and forwarding plane are hosted in separate devices. For example, the control plane may be hosted in a control device, such as a SDN controller, and the forwarding plane may be hosted in a network device such as a switch or router etc. The control device may communicate with the network device over a control channel and may populate the forwarding table of the network device. SDN allows flexible control of network traffic, and provides a good platform for core network (CN) and applications of the CN.

Control device of the SDN may maintain overall topology and links of a network, discover links and neighbor relationships among switch devices by using link discovery protocol, so as to avoid forming a loop logically by devices. Meanwhile, the control device of the SDN may establish the shortest flow path between any two devices, and support monitoring link state. When an exception occurs to a certain link, the control device of the SDN may update the shortest flow path in real time, to enable the flow to be transmitted along a new flow path.

When there is a large number of switch devices in a network, there may be multiple link connections among switch devices. Topology of the whole network may be complicated. When a network fault occurs, or network configuration is changed, the convergence time may be relatively longer. Since flow path is calculated based on topology, calculation amount about flow path for a complicated network topology may be greater.

DETAILED DESCRIPTIONS

Examples of the present disclosure provide a method for establishing instances in an SDN. The SDN may be divided into a plurality of instances. This division may be performed to the whole SDN based on networking requirements. A control device and a switch device may be both configured with an instance identification (ID) which identifies an SDN instance. The control device may manage switch devices within a same SDN instance of the control device, and manage topology structure of an SDN corresponding to the instance ID configured for the control device. The control device may also calculate flow paths based on the topology structure. In this way, as each SDN instance is smaller than the SDN as a whole, the topology may be simplified, convergence time of topology structure may be reduced, and the processing burden for calculating flow paths may also be reduced. This approach may also help to prevent issues with one device affecting the whole SDN network.

During specific implementations of the present disclosure, the whole SDN may be divided into instances. The instance division may be performed to the whole SDN based on networking requirements. For example, the whole SDN may be divided into a preset number of SDN instances. The preset number may be determined based on practical networking requirements.

In one example the SDN network may be divided into a plurality of instances, each instance for a different service type. For example, switch devices that are to execute data services may be assigned to a first SDN instance. Switch devices that are to execute voice services may be assigned to a second SDN instance.

After the SDN is divided into instances, each SDN instance is independent. Each SDN instance is separated from each other. Dedicated system resources may be allocated to each SDN instance. That is, in some examples, different SDN instances may not share system resources with each other.

When dividing the SDN into instances, the control device and switch device may be configured as follows.

The control device may be configured with an instance ID of each SDN instance managed by the control device. A control device may manage one SDN instance, or multiple SDN instances. When managing one SDN instance, the control device may be configured with the instance ID corresponding to the SDN instance. When managing multiple SDN instances, the control device may be configured with instance IDs of the multiple SDN instances managed by the control device.

When the configuration is finished, the control device may record and maintain configuration information, that is, the instance ID of SDN.

The switch device may be configured with an instance ID of an SDN instance. A switch device may belong to one SDN instance, or belong to multiple SDN instances. When a switch device belongs to a plurality of SDN instances, the switch device may be aken as a different switch device in each instance.

In an SDN instance to which the switch device belongs, the switch device may be configured with address of a control device of the SDN instance. When multiple SDN instances on the switch device are managed by a control device, IP address of the control device configured for the switch device is the same. When multiple SDN instances on the switch device are managed by different control devices, IP addresses of different control devices may be configured for the switch device.

A switch device may also designate device ID of the switch device. When the switch device belongs to different SDN instances, the designated device ID of the switch device in different SDN instances may be the same or different.

When a switch device belongs to multiple SDN instances, in other words, there are multiple SDN instances numbers on the switch device, the switch device needs to divide physical ports of the switch device. That is, which ports belong to an SDN instance, which ports belong to another SDN instance. Generally speaking, one physical port may belong to one SDN instance. When a physical port needs to be shared by multiple SDN instances, services of the physical port may be divided. For example, packets of some virtual local area networks (VLANs) may belong to one SDN instance. Packets of some other VLANs may belong to another SDN instance, such that the switch device and control device may uniquely differentiate an SDN instance to which a packet belongs.

When the configuration is finished, the switch device may record and maintain configuration information, that is, an instance ID of an SDN, a port number (port number of a port belonging to a corresponding SDN instance), an IP address of a control device (the IP address of the control device belonging to the corresponding SDN instance), and device ID of the switch device (device ID of the switch device belonging to the corresponding SDN instance).

Until now, configurations of the control device and switch device are completed.

In the foregoing configuration modes provided, the switch device and control device may be respectively configured with an instance ID of an SDN instance. The control device and switch device may be assigned to a same SDN instance, or different SDN instances. In practical implementations, the configuration may be performed to the control device. The switch device may be informed of information of related SDN instance configured, so as to divide SDN instances. The specific process may be as follows.

A control device may be configured with instance IDs of SDN instances managed by the control device, and may be configured with IP address, device ID and port number of each switch device in the managed SDN instance (port corresponding to the port number of the switch device belongs to the SDN instance).

The control device may transmit the instance ID of the SDN, the device ID and the port number to a corresponding switch device, by using a network management system or a network configuration protocol, based on the corresponding IP address, so that each switch device may store and maintain such information, and establish a connection to the corresponding control device.

To be compatible with existing implementations, the whole SDN is taken as an SDN corresponding to a default SDN instance in the examples of the present disclosure. When not receiving a protocol packet carrying an instance ID, the switch device or control device may determine that the protocol packet belongs to a default SDN, and process the protocol packet within the default SDN instance based on contents of the protocol packet.

Figure 1:
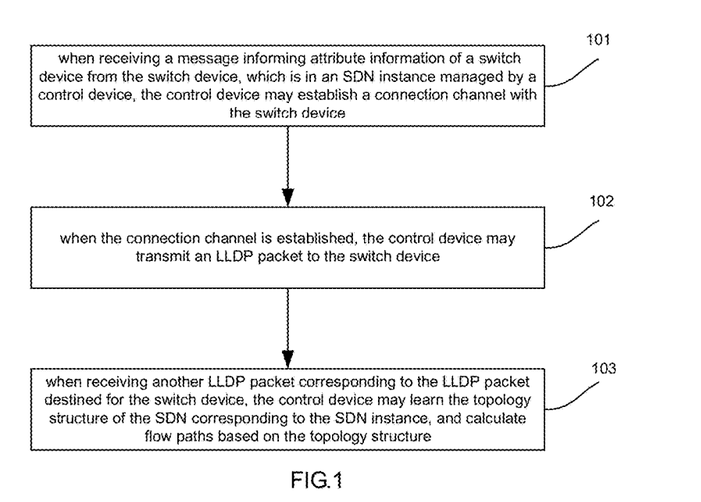
FIG. 1 is a flow chart illustrating to establish an instance by a control device, in accordance with an example of the present disclosure.

With reference to FIG. 1, FIG. 1 is a flow chart illustrating to establish an instance by a control device, in accordance with an example of the present disclosure. The specific blocks may be as follows.

In block 101, when receiving a message informing attribute information of a first switch device from the first switch device, which is in an SDN instance managed by a control device, the control device may establish a connection channel with the first switch device.

In the example of the present disclosure, the first switch device and control device are respectively configured to achieve division of SDN instances. After respectively configuring the control device and first switch device with an instance ID of an SDN instance, the first switch device may transmit a message informing attribute information of the first switch device to the control device, which corresponds to the address of the control device configured within the SDN instance to which the first switch device belongs.

The informed attribute information may include configuration information, feature information, port state information, and so on. Instance ID may be carried when transmitting the message, so as to identify the SDN instance to which the first switch device belongs. When transmitting the port state information, port state information about port belonging to the SDN instance may be transmitted.

When receiving the message, the control device may determine whether the first switch device transmitting the message and the control device are in the same SDN instance, based on the instance ID carried by the message. That is, the control device may determine whether the instance ID carried by the message has already been configured for the control device. When the control device has already been configured with the instance ID carried by the message, it is determined that the first switch device transmitting the message and the control device belong to the same SDN instance; otherwise, it is determined that the first switch device transmitting the message and the control device are not in the same SDN instance.

After receiving the message informing attribute information of the first switch device from the first switch device, which is in a different SDN instance of a control device, the control device may discard the message without processing the message.

After such processing, packets within an SDN instance may be processed within the SDN instance. Even if a packet of an SDN instance is transmitted to other SDN instances due to some reasons, switch device or control device in other SDN instances may not process the packet. Different SDN instances may be separated from each other, by using an instance ID of SDN carried by the packet.

When receiving the message informing attribute information of the first switch device from the first switch device, which is in the same SDN instance of the control device, the control device may record the attribute information informed by the first switch device, and establish a connection channel with the first switch device.

When the control device and first switch device communicate with each other by using open flow protocol, the connection channel established between the control device and first switch device in block 101 may be an open flow connection channel. Before establishing the open flow connection channel, a transmission control protocol (TCP) channel may be established to communicate information. The specific process may be as follows. Open flow is used as an example here, but the present disclosure is not limited thereto. Whenever the term "open flow" is used in the present disclosure it may be replaced with any other suitable SDN technology or protocol.

The first switch device may transmit a TCP packet to the control device, by using configured IP address of the control device. A TCP connection channel may be established between the control device and the first switch device. A hello message may be communicated through the established TCP connection channel. The control device may discover a switch device which is a neighbor of the control device.

The control device may transmit a request message to each switch device (that is, a switch device discovered to be a neighbor of the control device) within an SDN instance managed by the control device, to request each switch device to inform attribute information of each switch device.

When receiving the request from the control device, the first switch device may transmit the message informing attribute information of the first switch device to the control device. Configuration information in the attribute information may be related configuration information supporting the open flow protocol. The port state information is about a port within an SDN instance to which the first switch device belongs.

When receiving the message informing attribute information about the first switch device from the first switch device, which is in an SDN instance managed by the control device, the control device may establish a connection channel with the first switch device, that is, an open flow connection channel.

In specific implementations, the instance ID of the SDN instance may be carried by transmitted TCP packet, hello message, request message and the message informing attribute information, so as to identify the SDN instance configured for the device transmitting these messages. When an instance ID is not carried, processes may be executed according to default instance, so as to be compatible with existing version.

In block 102, when the connection channel is established, the control device may transmit a first LLDP packet to the first switch device.

The first LLDP packet, which is transmitted from the control device to the first switch device, may carry an instance ID of the same SDN instance located by the control device and first switch device, to enable the first switch device receiving the first LLDP packet to determine the SDN instance to which the control device belongs.

When receiving the first LLDP packet, the first switch device may determine whether the instance ID carried by the first LLDP packet is the same as the instance ID of SDN configured for the first switch device. When determining that the instance ID carried by the first LLDP packet is the same as the instance ID configured for the first switch device, the first switch device may process the first LLDP packet based on contents of the first LLDP packet; otherwise, the first switch device may discard the received first LLDP packet.

Under the circumstances that the control device and the first switch device communicate with each other by using the open flow protocol, the control device may perform an open flow encapsulation to the first LLDP packet, before transmitting the first LLDP packet to the first switch device. Before transmitting a second LLDP packet to the control device by a second switch device, the open flow encapsulation is also needed. The instance ID of the SDN instance to which the second switch device and control device belong may be carried in the encapsulated open flow header and the second LLDP packet, to facilitate processing of the peer end device.

After receiving the open flow-encapsulated first LLDP packet, which is transmitted by the control device within the same SDN instance of the first switch device, the first switch device may perform the de-encapsulation, and forward the de-encapsulated LLDP data frame through a port indicated by the open flow header.

After receiving the LLDP data frame forwarded by the first switch device, the peer end second switch device may perform the open flow encapsulation to the LLDP data frame, and transmit an open flow-encapsulated second LLDP packet to the control device within the same SDN instance, when learning the LLDP data frame forwarded by the first switch device within the same SDN instance based on the instance ID carried by the LLDP data frame. When executing the open flow encapsulation, in addition to encapsulating device ID of the second switch device receiving the LLDP data frame forwarded by the first switch device, and port number of the port receiving the LLDP data frame, instance ID of the SDN configured in the example of the present disclosure may also be carried. The instance ID is the same as that carried by the LLDP data frame to which no open flow encapsulation is performed.

In block 103, when receiving the second LLDP packet corresponding to the first LLDP packet destined for the first switch device, the control device may learn the topology structure of the SDN corresponding to the SDN instance, and calculate a flow path based on the topology structure.

The second LLDP packet received by the control device may carry an instance ID of an SDN instance to which the second switch device transmitting the second LLDP packet belongs. Based on the instance ID, the control device may determine whether the second switch device transmitting the second LLDP packet and the control device belong to the same SDN instance.

In the block, the control device may receive the second LLDP packet corresponding to the first LLDP packet destined for the first switch device. In other words, the control device may transmit the first LLDP packet to the first switch device, and receive a corresponding second LLDP packet from the second switch device.

The control device may transmit the first LLDP packet to each switch device within the SDN instance. After receiving the second LLDP packet corresponding to the transmitted first LLDP packet, the control device may learn topology structure of the SDN corresponding to the SDN instance, and calculate flow paths based on the topology structure. Since topology structure of each instantiated SDN is simpler than the topology structure of the whole SDN, calculation amount may be less, when calculating flow paths.

In the examples of the present disclosure, the switch device may bind and store port number of port of the switch device, packet's attribute, and instance ID of the SDN instance configured for the switch device.

When receiving a user side packet, the switch device may search for instance ID, based on the packet's attribute and port number of a port receiving the packet. The switch device may process the packet within the SDN instance corresponding to the instance ID. For example, the switch device may learn the source media access control (MAC) address of the packet, and forward the packet based on flow table rule issued within the SDN instance.

When topology structure of an SDN corresponding to a certain SDN instance changes, the topology structure of the SDN corresponding to the SDN instance may be updated. Flow path calculation within the SDN instance may also be executed based on updated topology structure.

A control device may determine whether topology structure of the SDN corresponding to the SDN instance changes, after receiving a port fault message carrying an instance ID of an SDN instance configured for the control device, belongs, or when the control device does not receive another LLDP packet, which corresponds to an LLDP packet received from the control device carrying the instance ID of the SDN instance configured for the control device, within a preset time period, or when the control device receives a message from a new switch device in the same SDN instance of the control device, which informs attribute information of the new switch device. And then, the control device may update the topology structure, and calculate flow paths within the SDN instance based on the topology structure updated.

In the examples of the present disclosure, after respectively configuring an instance ID of an SDN instance for the control device and switch device, that is, after dividing SDN instances, the topology of the SDN may be maintained based on divided SDN instances. After receiving a port fault message and an LLDP packet carrying the instance ID of the SDN instance, a switch device not belonging to a certain SDN instance, and a control device not managing the SDN instance may not process the port fault message and the LLDP packet received. Thus, topologies of other SDN instances may be not affected by topology change within one SDN instance. A complicated and large network topology may be divided based on SDN instance. Flow paths within an SDN instance may also be simplified.

When topology within an SDN instance changes, affected flow paths within the SDN instance may be updated in real time, while topologies of other SDN instances may not sense the above change. Topologies and flow paths of other SDN instances are not necessary to be updated.

The subsequent protocol packets communicated between the control device and switch device, or between switch device and switch device may carry an instance ID of an SDN instance on a device transmitting the packet. Flow paths for forwarding data packets among switch devices may be controlled by the control device. The switch device may process packets based on flow table rule issued by the control device.

When a control device manages more than two SDN instances, the control device may discover neighbors in different SDN instances. The control device may establish topology, calculate topology and process packets in the different SDN instances. Since each SDN instance is independent, each SDN instance is separated from each other. That is even if hosted on the same control device, different SDN instances may be managed separately and supported by separate system resources. Each SDN instance may have its own respective storing unit and processing unit hosted on the control device. These units may be implemented as modules of machine readable instructions executable by a processor. The storing units of each SDN instance are separated from each other, and are not shared between the SDN instances. Likewise the processing units of each SDN instance may be separated from each other and is not shared.

After receiving a packet (protocol packet or data packet) from a switch device, the control device may determine whether the packet carries an instance ID of an SDN instance.

If the packet carries an instance ID of an SDN instance, the control device may determine whether the SDN instance corresponding to the instance ID is managed by the control device. When determining that the SDN instance corresponding to the instance ID is managed by the control device, the control device may determine the SDN instance corresponding to the instance ID, and transmit the packet to the processing unit corresponding to the SDN instance to be processed; otherwise, the control device may discard the packet.

When determining that the packet does not carry an instance ID of an SDN instance, the control device may transmit the packet to a processing unit corresponding to the default SDN instance to be processed.

Figure 2:
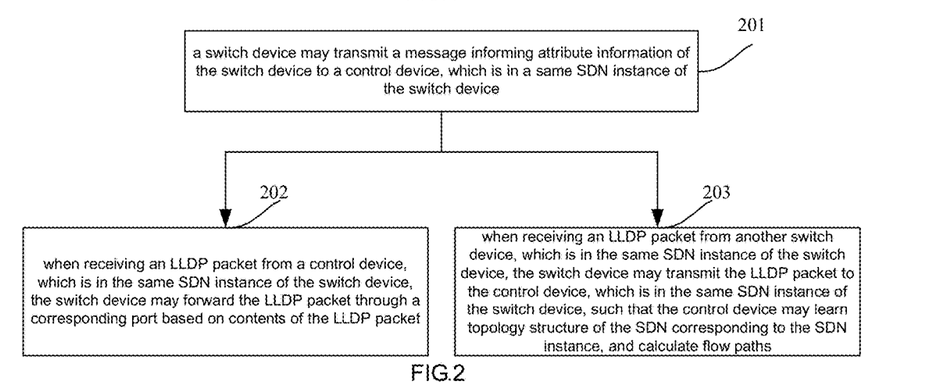
FIG. 2 is a flow chart illustrating to establish an instance by a switch device, in accordance with an example of the present disclosure.

With reference to FIG. 2, FIG. 2 is a schematic diagram illustrating to establish an instance by a switch device, in accordance with an example of the present disclosure. The specific blocks may be as follows.

In block 201, a switch device may transmit a message informing attribute information of the switch device to a control device, which is in a same SDN instance of the switch device.

The control device and switch device are respectively configured with an instance ID of an SDN instance. After configurations of the control device and switch device are completed, the switch device may transmit a message informing attribute information of the switch device to a control device, which corresponds to address of the control device configured within the SDN instance to which the switch device belongs.

The informed attribute information may include configuration information, feature information, port state information, and so on. When transmitting these messages, the instance ID may be carried, so as to identify the SDN instance to which the switch device belongs.

After receiving the message, the control device may determine whether the switch device transmitting the message and the control device are in the same SDN instance, based on the instance ID carried by the message. That is, the control device may determine whether the instance ID carried by the message has already been configured for the control device. When determining that the instance ID carried by the message has already been configured for the control device, the control device may determine that the switch device transmitting the message and the control device are in the same SDN instance; otherwise, the control device may determine that the switch device transmitting the message and the control device are not in the same SDN instance.

After receiving a message informing attribute information of a switch device from the switch device, which is in a different SDN instance of the control device, the control device may discard the message without processing the message.

When a switch device belongs to multiple SDN instances, in other words, there are multiple instance IDs on the switch device, the switch device may respectively transmit a message informing attribute information of the switch device in an SDN instance, to a control device of the SDN instance.

After receiving from a switch device a message informing attribute information of the switch device, which is in the same SDN instance of the control device, the control device may record attribute information informed by the switch device, and establish a connection channel with the switch device.

After establishing the connection channel, the control device may transmit an LLDP packet to the switch device.

In block 202, when receiving an LLDP packet from a control device, which is in the same SDN instance of the switch device, the switch device may forward the LLDP packet through a corresponding port based on contents of the LLDP packet, and terminate the process.

The LLDP packet transmitted by the control device to the switch device may carry the instance ID of the SDN instance, which has already been configured for the control device and switch device, such that the switch device receiving the LLDP packet may determine the SDN instance to which the control device belongs.

When receiving an LLDP packet by a switch device, the switch device may determine whether the instance ID carried by the LLDP packet is the same as that configured for the switch device. When determining that the instance ID carried by the LLDP packet is the same as that configured for the switch device, the switch device may process the LLDP packet based on contents of the LLDP packet; otherwise, the switch device may discard the received LLDP packet.

Under the circumstances that the control device and the switch device communicate with each other by using open flow protocol, when transmitting the LLDP packet, the control device may perform open flow encapsulation to the LLDP packet. The open flow encapsulation is also needed, when transmitting the LLDP packet by the switch device to the control device. Both of the encapsulated open flow header and LLDP packet carry the instance ID of the SDN instance, which is on the switch device and control device, to facilitate processing of the peer end device.

After receiving the open flow-encapsulated LLDP packet from the control device, which is in the same SDN instance of the switch device, the switch device may perform the de-encapsulation, and forward the de-encapsulated LLDP packet through a port indicated by the open flow header.

In block 203, when receiving the LLDP packet from another switch device, which is in the same SDN instance of the switch device, the switch device may transmit the LLDP packet to the control device, which is in the same SDN instance of the switch device, such that the control device may learn topology structure of the SDN corresponding to the SDN instance, and calculate flow paths.

After receiving an LLDP packet, the switch device may determine whether the device transmitting the LLDP packet and the switch device are in the same SDN instance, based on the instance ID carried by the LLDP packet.

After receiving an LLDP packet from another switch device, when determining by the switch device that the instance ID carried by the LLDP packet is the same as the instance ID on the switch device, that is, when determining that the LLDP packet transmitted by another switch device in the same SDN instance of the switch device is received, the open flow encapsulation is performed to the LLDP packet. And then, the open flow-encapsulated LLDP packet is transmitted to the control device within the same SDN instance. When performing the open flow encapsulation, in addition to encapsulating the device ID of the switch device, which receives the LLDP packet forwarded by another switch device, port number of the port receiving the LLDP packet, the instance ID of the SDN instance configured in the example of the present disclosure is also necessary to be carried. The instance ID is the same as the instance ID carried by the LLDP packet to which no open flow encapsulation is performed.

Figure 3:
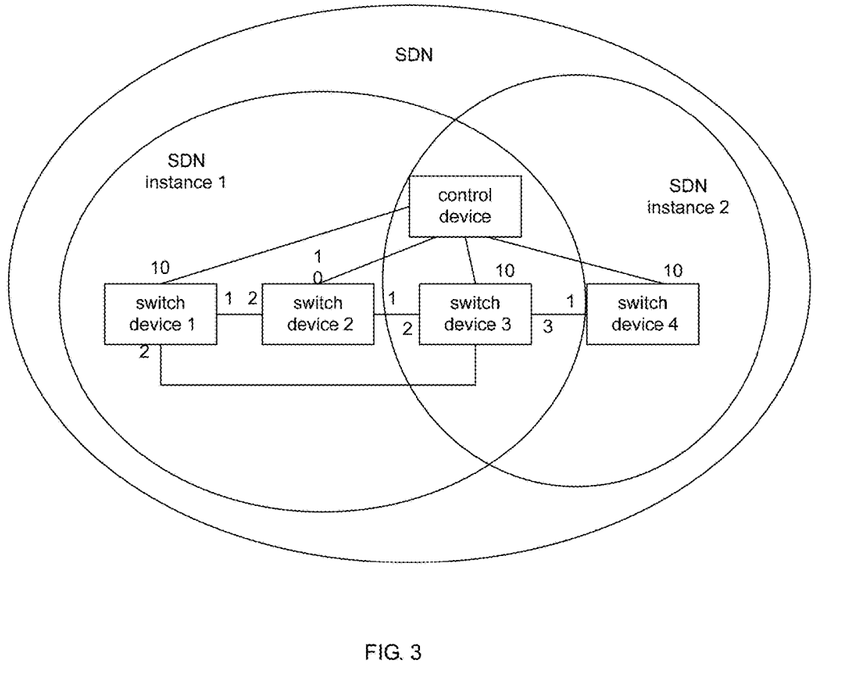
FIG. 3 is an SDN schematic diagram illustrating to manage two SDN instances by a controller, in accordance with an example of the present disclosure.

With reference to FIG. 3, FIG. 3 is an SDN schematic diagram illustrating that a controller manages two SDN instances, in accordance with an example of the present disclosure.

Figure 4:
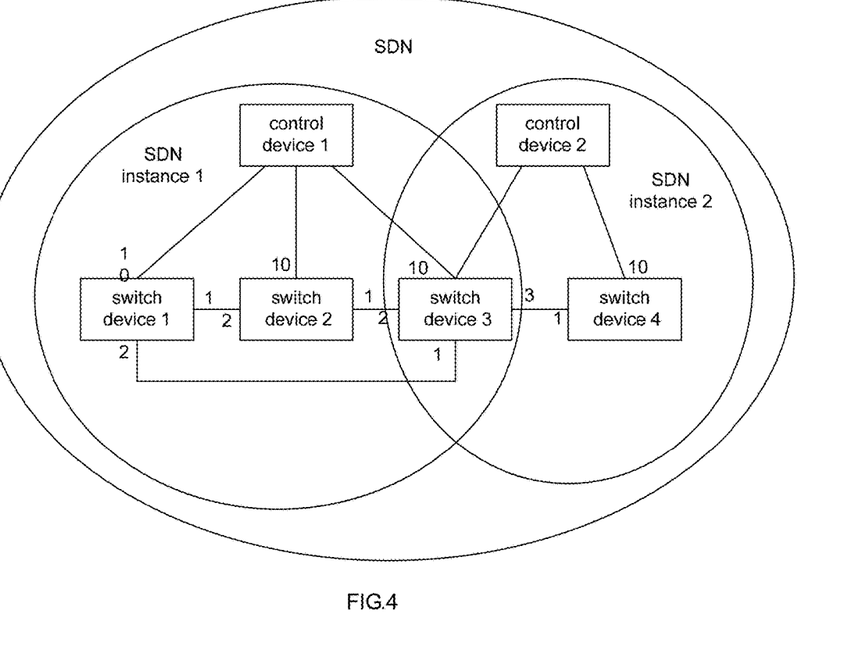
FIG. 4 is an SDN schematic diagram illustrating to manage an SDN instance by a controller, in accordance with an example of the present disclosure.

With reference to FIG. 4, FIG. 4 is an SDN schematic diagram illustrating that a controller manages an SDN instance, in accordance with an example of the present disclosure.

There may be at least one control device in the whole SDN. Each control device may manage at least one SDN instance. As shown in FIG. 3, the control device may manage SDN instance 1 and SDN instance 2. Thus, the control device may manage two SDN instances. In specific implementations, a control device may manage multiple SDN instances.

As shown in FIG. 4, control device 1 may manage SDN instance 1. Control device 2 may manage SDN instance 2. Thus, the control device in FIG. 4 may manage one SDN instance. The network architectures in FIG. 3 and FIG. 4 are examples. In specific applications, network architecture may be flexibly configured by user based on practical requirements.

Take FIG. 3 as an example, the process of dividing the SDN into instances is described in detail in the following.

An example is given, in which the SDN shown in FIG. 3 is divided into two SDN instances, SDN instance 1 and SDN instance 2. Switch device 1, switch device 2 and switch device 3 belong to SDN instance 1. Switch devices 3 and 4 belong to SDN instance 2. Ports 1 and 2 of switch device 1 join SDN instance 1. Port 10 of switch device 1 is a control port of SDN instance 1. That is, switch device 1 communicates with control device through port 10. Ports 2 and 1 of switch device 2 join SDN instance 1. Port 10 is a control port of switch device 2. Ports 2 and 1 of switch device 3 join SDN instance 1. Port 10 of switch device 3 is a control port of SDN instance 1 and SDN instance 2. Port 3 of switch device 3 joins SDN instance 2. Port 1 of switch device 4 joins SDN instance 2. Port 10 of switch device 4 is a control port of SDN instance 2. The control device may configure and manage SDN instances 1 and 2.

Thus, it can be seen that a switch device may be in one SDN instance, such as switch devices 1, 2 and 4. A switch device may also belong to a plurality of SDN instances. For example, switch device 3 may belong to SDN instances 1 and 2. For control device 1, switch device 3 may be taken as two different devices.

Address of control device on switch devices 1 and 2 is address of control device 1. In SDN instances 1 and 2, address of control device on switch device 3 is address of control device 1. Address of control device on switch device 4 is address of control device 1.

Device ID of switch device 1 is 1. Device ID of switch device 2 is 2. Since switch device 3 belongs to different SDN instances, device ID of switch device 3 in the two SDN instances may be 3. Alternatively, switch device 3 may have different device IDs in the two SDN instances. Device ID of switch device 4 may be 4.

If there is a physical connection between switch devices in different SDN instances, e.g., there is a physical connection between switch devices 1 and 4, the physical connection is not taken as a link connection. That is, the physical connection is not taken as a logical connection.

Take the switch devices in SDN instance 2 as an example, switch devices 3 and 4 also are to be configured with the IP address of control device 1, so that they may transmit a TCP packet to control device 1 by using the configured IP address. When transmitting the TCP packet, the instance ID configured for the switch device may be carried in the TCP packet. When receiving the TCP packets from switch devices 3 and 4, control device 1 may establish TCP connections to switch devices 3 and 4 in SDN instance 2.

After the TCP connection is established, hello message may be communicated. In SDN instance 2, the control device may discover neighbor devices are switch devices 3 and 4, and respectively transmit a request message to switch devices 3 and 4. Instance ID 2 may be respectively carried by communicated hello packet, and transmitted request message.

When receiving the request message carrying instance ID 2 from the control device, switch devices 3 and 4 may transmit an open flow message informing respective attribute information in SDN instance 2 to control device 1, by using open flow protocol. Message header of the open flow message may carry instance ID of the SDN instance on switch device 3 or 4 transmitting the open flow message.

The attribute information of switch device may include configuration information, feature information, port state information, and so on.

In the example, connection between control device and switch device is achieved, but not limited to, the open flow protocol. Under the circumstances, the switch device is an open flow switch, and the control device is an SDN controller.

After receiving the open flow message, control device 1 may determine that instance ID 2 carried by the open flow message is instance ID of the SDN instance on control device 1. And then, control device 1 may respectively establish an open flow connection channel with switch devices 3 and 4 in SDN instance 2.

After receiving the open flow message, hello message or echo message, validity check may be performed by the switch device and control device. That is, the switch device or control device may determine whether the carried instance ID is the same as instance ID of the SDN instance on the switch device or control device. When determining that the carried instance ID is the same as instance ID of the SDN instance on the switch device or control device, the switch device or control device may process the received open flow message, hello message or echo message; otherwise, the switch device or control device may discard the received open flow message, hello message or echo message.

After the open flow connection is respectively established between control device 1 and switch devices 3, 4, link discovery may be executed. In the discovery process, LLDP packet or broadcast link layer discovery protocol (BDDP) packet may be used. When each switch device is directly connected, the LLDP packet may be used. When switch devices are connected with each other by using non-SDN switch device, such as hub, link discovery may be executed by using the BDDP packet. In the example, switch devices are directly connected, and the link discovery is executed by using the LLDP packet. Specific discovery process may be as follows. Where the term LLDP packet is used in the claims, it is to be interpreted in a broad sense of including at least both LLDP and BDDP packets.

Since there is one port in each of switch devices 3 and 4 to connect with another switch device in SDN instance 2, an open flow-encapsulated LLDP packet is necessary to be transmitted to switch devices 3 and 4.

Switch device 3 may indicate to transmit the LLDP packet through port 3 of switch device 3.

Device ID 3, port 3 and instance ID 2 of switch device 3 may be carried by the open flow message header encapsulated for the LLDP packet, which is transmitted through port 3. Device ID 3, port 3 and instance ID 2 of switch device 3 may also be carried in the LLDP packet. The instance ID is both carried by the open flow header and LLDP packet.

After receiving the open flow-encapsulated LLDP packet from control device 1, switch device 3 may determine that instance ID 2 carried by the open flow message is instance ID of the SDN instance on switch device 3. Switch device 3 may also determine that carried device ID is device ID of switch device 3. And then, switch device 3 may de-encapsulate the open flow header of the LLDP packet, and forward the de-encapsulated LLDP packet through port 3.

After receiving the LLDP packet from switch device 3, switch device 4 may determine that the instance ID carried by the LLDP packet is instance ID 2, perform the open flow encapsulation to the LLDP packet, and transmit the encapsulated LLDP packet to control device 1 through control port 10. When performing the open flow encapsulation, switch device 4 may encapsulate instance ID 2, device ID 4 of switch device 4, and port number 1 of the port receiving the LLDP packet.

Other processes may be performed to un-received LLDP packet. Thus, the LLDP packet encapsulated with open flow header destined for control device 1 may still carry instance ID 2, as well as device ID 3 and port number 3 of switch device 3.

When receiving the open flow message from switch device 4, control device 1 may perform the validity check, determine that the instance ID carried by the open flow message is instance ID 2, and process the open flow message within SDN instance 2 configured for control device 1. And then, control device 1 may learn device ID 4 and port number 1 of switch device 4 carried by the open flow message, perform the open flow de-encapsulation to the LLDP packet, and obtain device ID 3 and port number 3 of switch device 3, which are carried by the de-encapsulated LLDP packet.

Thus, control device 1 may learn that the link between port 1 of switch device 4 and port 3 of switch device 3 is connected.

Interactions between control device 1 and switch device 3 are described in the foregoing contents. Interactions between control device 1 and switch device 4 are similar, which are not repeated here.

After topology in the SDN is converged, control device 1 may learn topology structure of the SDN corresponding to SDN instance 2, and calculate flow paths based on the learned topology structure.

Process of instantiating the whole topology of the SDN will be described in the following in detail, by taking FIG. 4 as an example.

An example is given in the following, in which the SDN in FIG. 4 is divided into two SDN instances, SDN instance 1 and SDN instance 2. Switch devices 1, 2, and 3 belong to SDN instance 1. Switch devices 3 and 4 belong to SDN instance 2. Ports 1 and 2 of switch device 1 may join SDN instance 1. Port 10 of switch device 1 is a control port of SDN instance 1. That is, switch device 1 may communicate with the control device through port 10. Ports 2 and 1 of switch device 2 may join SDN instance 1. Port 10 of switch device 2 may be a control port. Ports 2 and 1 of switch device 3 may join SDN instance 1. Port 10 of switch device 3 is a control port of SDN instance 1 and SDN instance 2. Port 3 of switch device 3 may join SDN instance 2. Port 1 of switch device 4 may join SDN instance 2. Port 10 of switch device 4 may be a control port of SDN instance 2. Control device 1 may configure SDN instance 1, so as to manage SDN instance 1. Control device 2 may configure SDN instance 2, so as to manage SDN instance 2.

Thus, it can be seen that a switch device may be in an SDN instance, such as switch devices 1, 2, and 4. A switch device may be also in a plurality of SDN instances. For example, switch device 3 may belong to SDN instance 1 and SDN instance 2. For control devices 1 and 2, switch device 3 may be taken as two different devices. In specific implementations, a control device may manage multiple SDN instances. For example, control device 1 may manage SDN instances 1 and 2. SDN instances 1 and 2 may be configured for control device 1.

Address of control device on switch devices 1 and 2 is address of control device 1. In SDN instance 1, address of control device on switch device 3 may be address of control device 2. In SDN instance 2, address of control device on switch device 3 may be address of control device 2. Address of control device on switch device 4 may be address of control device 2.

Device ID of switch device 1 may be 1. Device ID of switch device 2 may be 2. Since switch device 3 belongs to different SDN instances, device ID of switch device 3 in two SDN instances may be 3. Alternatively, device ID of switch device 3 may be different in the two SDN instances. Device ID of switch device 4 may be 4.

When there is a physical connection between switch devices in different SDN instances, e.g., there is a physical connection between switch devices 1 and 4, the physical connection is not taken as a link connection, that is, is not taken as a logical connection.

A switch device in the SDN may be configured with IP address of control device, which is in the same SDN instance of the switch device, so as to establish the TCP connection. After the TCP connection is established, neighbor discovery may be executed by the control device.

After the neighbor discovery is completed, the control device may transmit a request to a neighbor device (a switch device in the same SDN instance of the control device), such that the neighbor device may report attribute information of the neighbor device in the SDN instance.

A switch device may transmit an open flow message to a control device by using the open flow protocol, to inform attribute information of the switch device. Message header of the open flow message may carry instance ID of the SDN instance on the switch device.

The attribute information of the switch device may include configuration information, feature information, port state information, and so on.

In the example, connection between the control device and switch device may be achieved by using, but not limited to, the open flow protocol. The switch device may be an open flow switch. The control device may be an SDN controller. Take SDN instance 1 as an example, suppose switch device 1 is firstly configured, switch device 1 may transmit an open flow message carrying attribute information of switch device 1 to control device 1 through port 10, in which the open flow message may further carry instance ID 1.

When receiving the open flow message, control device 1 may determine that instance ID 1 carried by the open flow message is the instance ID on control device 1. And then, control device 1 may establish an open flow connection with the switch device.

In specific implementations, the open flow connection may be established with hello message. The established open flow connection may be maintained with echo message. Instance ID 1 may be carried in both the hello message and the echo message.

When receiving the open flow message, hello message or echo message, the switch device or control device may execute the validity check. That is, the switch device or control device may determine whether the carried instance ID is the same as instance ID on the switch device or control device. When determining that the carried instance ID is the same as instance ID on the switch device or control device, the switch device or control device may process the received open flow message, hello message or echo message; otherwise, the switch device or control device may discard the received open flow message, hello message or echo message.

After establishing the open flow connection between control device 1 and switch device 1, link discovery may be executed. During the process of link discovery, LLDP packet or BDDP packet may be used. When each switch device is directly connected with each other, the LLDP packet may be used. When switch devices are connected with each other by using non-SDN switch device, such as hub, the BDDP packet may be used to execute the link discovery. In the example, switch devices are directly connected with each other. The link discovery is executed by using the LLDP packet. Specific discovery process may be as follows.

Since two ports of switch device 1 connect with other switch devices in SDN instance 1, they may transmit two open flow-encapsulated LLDP packets to switch device 1.

An open flow-encapsulated LLDP packet may indicate switch device 1 to transmit the LLDP packet through port 1. The other open flow-encapsulated LLDP packet may indicate switch device 1 to transmit the LLDP packet through port 2.

The open flow message header encapsulated for the LLDP packet to be transmitted through port 1 may carry device ID 1, port 1 and instance ID 1 of switch device 1. The LLDP packet may also carry device ID 1, port 1 and instance ID 1 of switch device 1. Both of the open flow message header and LLDP packet may carry the instance ID.

The open flow message header encapsulated for the LLDP packet to be transmitted through port 2 may carry device ID 1, port 2, and instance ID 1 of switch device 1. The LLDP packet may also carry device ID 1, port 2 and instance ID 1 of switch device 1.

When receiving the first open flow-encapsulated LLDP packet from control device 1, switch device 1 may determine that instance ID 1 carried by the open flow message is the instance ID on switch device 1. Switch device 1 may also determine that device ID carried by the open flow message is device ID 1 of switch device 1. And then, switch device 1 may de-encapsulate the open flow message header of the LLDP packet, and forward the de-encapsulated LLDP packet through port 1.

When receiving the LLDP packet from switch device 1, switch device 2 may determine that the instance ID carried by the LLDP packet is instance ID 1. Switch device 2 may perform the open flow encapsulation to the LLDP packet, and transmit the open flow-encapsulated LLDP packet to control device 1 through control port 10. When performing the open flow encapsulation, instance ID 1, device ID 2 of switch device 2, and port number 2 of the port receiving the LLDP packet are also encapsulated.

Since no other processing is performed to the received LLDP packet, the LLDP packet encapsulated with open flow message header to be transmitted to control device 1 may still carry instance ID 1, device ID 1 of switch device 1 and port number 1.

When receiving the second open flow message, switch device 1 may execute processes similar to that of the first open flow message, which is not repeated here.

In the example, in addition to carrying the instance ID, the LLDP packet may also inform switch device 1 to forward packets through port 1, and may carry source information (device ID, port number of switch device 1), and so on.

Figure 5:
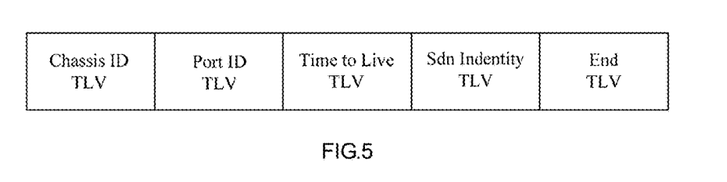
FIG. 5 is a schematic diagram illustrating structure of a link layer discovery protocol (LLDP) packet, in accordance with an example of the present disclosure.

With reference to FIG. 5, FIG. 5 is a schematic diagram illustrating structure of an LLDP packet, in accordance with an example of the present disclosure. The sdn identity and type length value (TLV) in the packet structure of the LLDP packet may be used for carrying the instance ID of the SDN instance.

Similarly, the open flow message header may carry the instance ID of SDN instance.

When receiving the open flow message from switch device 2, the control device may perform the validity check, determine that the instance ID carried by the open flow message is instance ID 1, and learn device ID and port number 2 of switch device 2 carried by the open flow message. And then, the control device may perform the open flow de-encapsulation to the open flow message, and obtain device ID 1 and port number 1 of switch device 1 carried by the de-encapsulated LLDP packet. Similar processes may be executed for the open flow message received from switch device 3.

Thus, control device 1 may learn that the link between port 1 of switch device 1 and port 2 of switch device 2 are connected. Control device 1 may also learn that the link between port 2 of switch device 1 and port 1 of switch device 3 are connected.

Interactions between control device 1 and switch device 2, 3 are similar to the interactions between control device 1 and switch device 1 described above, which are not repeated here.

After topology in the SDN is converged, the control device may learn the topology structure of the SDN corresponding to SDN instance 1, and calculate flow paths based on the learned topology structure.

When a certain port of a switch device within SDN instance 1 is down, such as port 1 of switch device 1, switch device 1 may transmit a port fault message to control device 1 through control port 10. The port fault message may carry instance ID 1.

After receiving the port fault message, control device 1 may update topology structure learned, that is, identify a link fault between switch device 1 and switch device 2. Control device 1 may re-calculate flow paths, based on the updated topology structure in SDN instance 1.

The control device may periodically trigger an LLDP packet to a port of a switch device within an SDN instance, which is managed by the control device. When not receiving a corresponding LLDP packet responded by the switch device, the control device may determine that the link between corresponding switch devices is down.

When control device 1 transmits an open flow message to switch device 1, and the LLDP packet carried by the open flow message is used to trigger port 1 of switch device 1 to forward the LLDP packet, the open flow encapsulation may be performed by switch device 2 to the LLDP packet carried by the open flow message. And then, the open flow-encapsulated LLDP packet may be transmitted by switch device 2 to control device 1.

When control device does not receive a message indicating that the open flow encapsulation is performed to corresponding LLDP from switch device 2 within a preset period, the control device may determine that the link between switch devices 1 and 2 is down. The control device may update the topology structure of switch devices in SDN instance 1, and calculate flow paths based on the updated topology structure.

Figure 6:
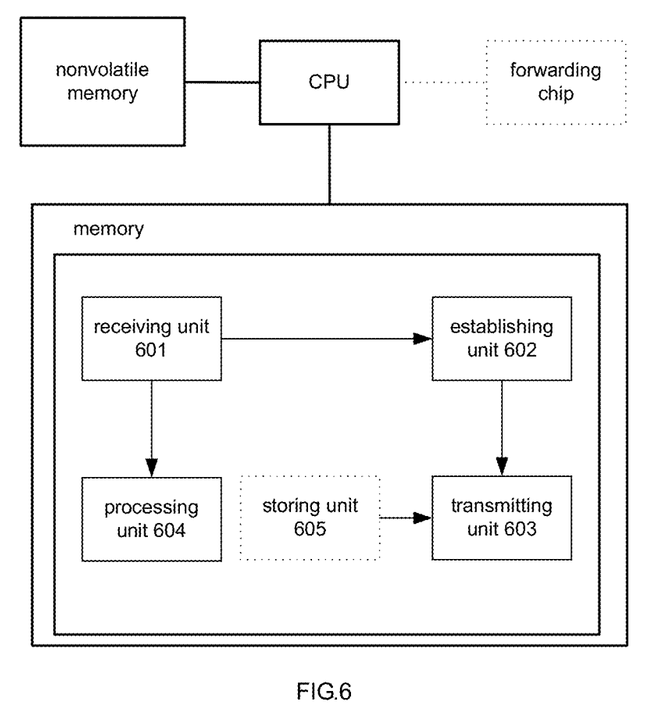
FIG. 6 is a schematic diagram illustrating hardware structure of a control device, in accordance with an example of the present disclosure.

The control device in the examples of the present disclosure may include a processor and a non-transitory storage medium storing machine readable instructions executable by the processor. From the aspect of hardware, with reference to FIG. 6, FIG. 6 is a schematic diagram illustrating hardware structure of a control device, in accordance with an example of the present disclosure. The control device may include a processor such as a central processing unit (CPU) and a non-transitory storage. The control device may be configured with an instance ID of an SDN instance, to which the control device belongs.

The non-transitory storage medium may store machine readable instructions that are executable by the processor to perform various functions described in the present disclosure such as establishing instances in SDN, as well as various lists, e.g., an instance ID of an SDN, and so on. The control device may include a receiving unit 601, an establishing unit 602, a transmitting unit 603 and a processing unit 604 which may be implemented by the processor executing the machine readable instructions.

The receiving unit 601 is to receive from a first switch device a message informing attribute information of the first switch device, and receive a second LLDP packet.

The establishing unit 602 is to establish a connection channel with the first switch device, when the receiving unit 601 receives the message from the first switch device informing attribute information of the first switch device, in which the first switch device and the control device are in the same SDN.

The transmitting unit 603 is to transmit a first LLDP packet to the first switch device, when the establishing unit 602 has established the connection channel.

The processing unit 604 is to obtain topology structure of the SDN corresponding to the SDN instance, and calculate flow paths based on the topology structure, when the receiving unit 601 receives a second LLDP packet from a second switch device corresponding to the first LLDP packet destined for the first switch device.

In addition, the receiving unit 601 is further to determine whether the first switch device and the control device are in the same SDN instance, based on the instance ID, when the received message carries the instance ID of the SDN instance on the first switch device. The receiving unit 601 is further to determine whether the second switch device and the control device belong to the same SDN instance, based on the instance ID, when the received second LLDP packet carries the instance ID of the SDN instance on the second switch device transmitting the second LLDP packet.

When transmitting the first LLDP packet to the first switch device, the transmitting unit 603 is further to add the instance ID of the SDN instance on the control device and the first switch device to the first LLDP packet, such that the first switch device receiving the first LLDP packet may determine the SDN instance to which the control device belongs.

In addition, when the receiving unit 601 receives a protocol packet carrying the instance ID of the SDN instance on the control device, the processing unit 604 is further to process the protocol packet based on contents of the received protocol packet. When the receiving unit 601 receives a protocol packet carrying an instance ID of an SDN instance not on the control device, the processing unit 604 may discard the received protocol packet. When the receiving unit 601 receives a protocol packet not carrying an instance ID, the processing unit 604 is further to process the protocol packet received based on a default instance. The SDN corresponding to the default instance is the whole SDN, that is, the SDN before being instantiated.

In addition, the processing unit 604 is further to update the topology structure of the SDN corresponding to the SDN instance, and calculate flow paths based on the topology structure updated, when determining the topology structure in the SDN corresponding to the SDN instance changes.

In addition, the control device may further include a storing unit 605.

The storing unit 605 is to configure and store the instance ID of the SDN instance managed by the control device. The instance ID of the SDN instance to which a switch device belongs is on the switch device.

In addition, the control device may further include the storing unit 605.

The storing unit 605 is to configure and store the instance ID of the SDN instance managed by the control device, an IP address and a port number of a managed switch device within the SDN instance.

The transmitting unit 603 is further to inform the switch device of the instance ID of the SDN instance stored by the storing unit 605, and the port number of the managed switch device within the SDN instance, based on the IP address of the switch device.

Furthermore, when the control device manages more than two SDN instances, the storing unit, processing unit and establishing unit of each managed SDN instance are independent, and may not communicate with each other. Resources of the storing unit, processing unit and establishing unit of each managed SDN instance are not shared.

The control device shown in FIG. 6 may further include a forwarding chip to receive and forward packets to and from external devices such as a network device.

Figure 7:
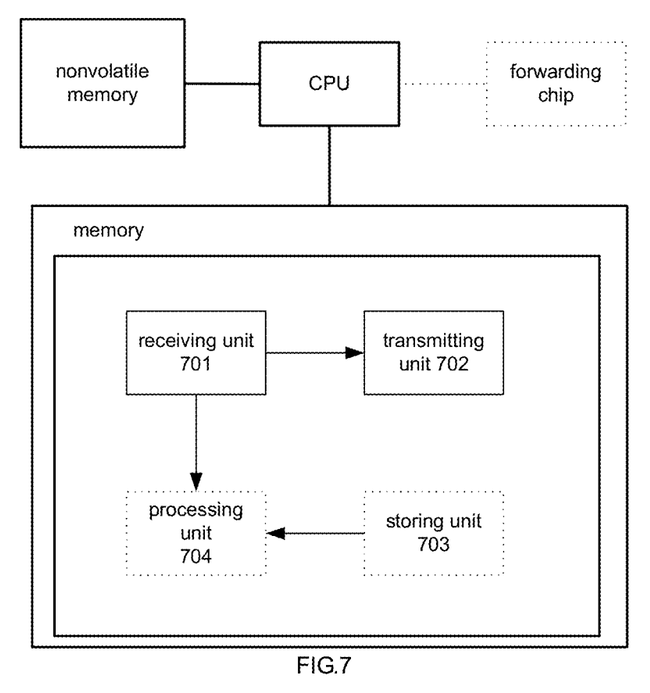
FIG. 7 is a schematic diagram illustrating hardware structure of a switch device, in accordance with an example of the present disclosure.

The switch device in the example of the present disclosure may be a programmable device that combines hardware with machine readable instructions. From the aspect of hardware, with reference to FIG. 7, FIG. 7 is a schematic diagram illustrating hardware structure of a switch device, in accordance with an example of the present disclosure. The switch device may include a non-transitory storage medium and a processor such as a CPU that is to execute the machine readable instructions. The switch device is configured with an instance ID of an SDN instance to which the switch device belongs. The instance ID may be stored in the non-transitory storage medium. The machine readable instructions may, when executed, act as a transmitting unit 701 and a receiving unit 702.

The transmitting unit 701 is to transmit a message informing attribute information of the switch device to a control device, which is in the same SDN instance of the switch device. When the receiving unit 702 receives a first LLDP packet from the control device, which is in the same SDN instance of the switch device, the transmitting unit 701 is further to forward an LLDP data frame through a corresponding port based on contents in the first LLDP packet. When the receiving unit 702 receives an LLDP data frame from another switch device, which is in the same SDN instance of the switch device, the transmitting unit 701 is further to transmit a third LLDP packet to the control device being in the same SDN instance of the switch device, such that the control device may learn topology structure of the SDN corresponding to the SDN instance, and calculate flow paths.

The receiving unit 702 is further to receive the first LLDP packet.

Before transmitting the message informing attribute information of the switch device, the transmitting unit 701 may further add the instance ID of the SDN instance on the switch device to the message, such that the control device receiving the message may determine the SDN instance on the switch device. Before transmitting the third LLDP packet to the control device, the transmitting unit 701 may further add the instance ID of the SDN instance on the switch device to the third LLDP packet, such that the control device receiving the third LLDP packet may determine the SDN instance on the control device.

When receiving the first LLDP packet, the receiving unit 702 is further to determine whether the control device transmitting the first LLDP packet and the switch device are in the same SDN instance, based on the instance ID carried by the first LLDP packet.

The switch device may further include a storing unit 703 and a processing unit 704.

The storing unit 703 is to bind and store a port number of a port of the switch device, attribute of a packet, the instance ID of the SDN instance on the switch device The receiving unit 702 is further to receive a packet from a user side.

When the receiving unit 702 receives the packet from the user side, the processing unit 704 is further to search for an instance ID in the storing unit 703, based on attribute of the packet and port number of the port receiving the packet, and process the packet within the SDN instance corresponding to the instance ID searched out.

The switch device shown in FIG. 7 may further include a forwarding chip to handle receiving and forwarding of packets.

In view of above, the whole SDN may be divided into various instances based on different networking situations in the present disclosure. The control device and switch device may be respectively configured with an instance ID of an SDN instance. The control device may manage switch devices within the same SDN instance of the control device, manage topology structure of the SDN corresponding to the SDN instance of the control device, and calculate flow paths based on the topology structure. In this way, topology structure of SDN may be simpler, and convergence time of topology structure may be reduced.

After dividing the SDN into instances, the topology of SDN may be maintained separately for each instance. Topologies of other instances may be not affected by topology's change within one instance. After dividing a complicated and large network based into a plurality of instances, the topology of each instance may be simpler than the topology of the original large network as a whole and flow paths within the instance may also be simplified.

What is claimed is:

1. A method for establishing an instance in a software defined network (SDN), comprising:

respectively configuring an instance identification (ID) of an SDN instance for a control device, a first switch device and a second switch device;

receiving, by the control device, a message from the first switch device within an SDN instance managed by the control device, and establishing a connection channel with the first switch device, wherein the message is to inform the control device of attribute information of the first switch device;

transmitting, by the control device, a first link layer discovery protocol (LLDP) packet to the first switch device, when the connection channel is established;

obtaining, by the control device, a topology structure of the SDN corresponding to the SDN instance, based on a second LLDP packet received by the control device, and calculating flow paths based on the obtained topology structure; and configuring and storing, by the control device, the instance ID of the SDN instance managed, an internet protocol (IP) address and a port number of a managed switch device within the SDN instance, and informing the switch device of the instance ID of the SDN instance, the port number of the managed switch device within the SDN instance, based on the IP address of the switch device.

2. The method according to claim 1, further comprising:

receiving, by the control device, the message carrying the instance ID of the SDN instance on the first switch device, determining whether the first switch device and the control device belong to a same SDN instance, based on the instance ID;

when determining the first switch device and the control device belong to the same SDN instance, adding, by the control device, the instance ID on the first switch device and the control device to the first LLDP packet, and transmitting the first LLDP packet to the first switch device, such that the first switch device receiving the first LLDP packet determines the SDN instance on the control device;

receiving, by the control device, the second LLDP packet carrying the instance ID of the SDN instance on the second switch device, and determining whether the second switch device and the control device are in the same SDN instance based on the instance ID.

3. The method according to claim 2, further comprising:
receiving, by the control device, a protocol packet carrying the instance ID of the SDN instance on the control device, and processing the protocol packet based on contents of the protocol packet received;
receiving, by the control device, a protocol packet carrying an instance ID of an SDN instance not on the control device, and discarding the protocol packet received;
receiving, by the control device, a protocol packet not carrying an instance ID, and processing the received protocol packet based on a default instance, wherein the default instance corresponds to the whole SDN.

4. The method according to claim 1, further comprising:
determining, by the control device, the topology structure in the SDN corresponding to the SDN instance changes, updating the topology structure of the SDN corresponding to the SDN instance, and calculating flow paths based on the topology structure updated.

5. The method according to claim 2, further comprising:
configuring and storing, by the control device, the instance ID of managed SDN instance, wherein the instance ID of the SDN instance to which the switch device belongs is on the switch device.

6. A control device for use in a software defined network (SDN), wherein the control device comprises a receiving unit, an establishing unit, a transmitting unit and a processing unit, wherein the receiving unit is to receive a message from a first switch device informing attribute information of the first switch device, and receive a second link layer discovery protocol (LLDP) packet;
the establishing unit is to establish a connection channel with the first switch device, when the receiving unit has received the message from the first switch device within the managed SDN instance informing attribute information of the first switch device;
the transmitting unit is to transmit a first LLDP packet to the first switch device, when the establishing unit has established the connection channel;
the processing unit is to obtain topology structure of the SDN corresponding to the SDN instance, and calculate flow paths based on the topology structure, when the receiving unit receives the second LLDP packet from a second switch device;
wherein the storing unit is to configure and store the instance ID of the SDN instance managed by the control device, an internet protocol (IP) address and a port number of a managed switch device within the SDN instance; and
the transmitting unit is further to inform the switch device of the instance ID of the SDN instance stored by the storing unit, the port number of the managed switch device within the SDN instance, based on the IP address of the switch device.

7. The control device according to claim 6, wherein the receiving unit is further to receive a message carrying the instance ID of the SDN instance on the first switch device, determine whether the first switch device and the control device belong to a same SDN instance based on the instance ID, receive the second LLDP packet carrying the instance ID of the SDN instance on the second switch device transmitting the second LLDP packet, and determine whether the second switch device and the control device belong to the same SDN instance based on the instance ID;
the transmitting unit is further to add the instance ID of the SDN instance on the control device and the first switch device to the first LLDP packet, transmitting the first LLDP packet to the first switch device, such that the first switch device receiving the first LLDP packet determines the SDN instance of the control device.

8. The control device according to claim 7, wherein the processing unit is further to process a protocol packet based on contents of the protocol packet received, after the receiving unit receives the protocol packet carrying the instance ID of the SDN instance on the control device;
the processing unit is further to discard a protocol packet received, after the receiving unit receives the protocol packet carrying an instance ID of an SDN instance not on the control device; and
the processing unit is further to process a protocol packet received based on a default instance, after the receiving unit receives the protocol packet not carrying an instance ID, wherein the SDN corresponding to the default instance is the whole SDN.

9. The control device according to claim 6, wherein the processing unit is further to update the topology structure of the SDN corresponding to the SDN instance, and calculate flow paths based on the topology structure updated, when determining the topology structure of the SDN corresponding to the SDN instance changes.

10. The control device according to claim 7, wherein control device further includes a storing unit, the storing unit is to configure and store the instance ID of the SDN instance managed by the control device, wherein the instance ID of the SDN instance to which a switch device belongs is on the switch device.

11. A switch device for use in a software defined network (SDN), wherein the switch device is configured with an instance identification (ID) of an SDN instance and comprises a transmitting unit and a receiving unit;
the transmitting unit is to transmit a message informing attribute information of the switch device to a control device within a same SDN instance of the switch device;
the transmitting unit is further to forward a link layer discovery protocol (LLDP) data frame through a corresponding port based on contents of a first LLDP packet, when the receiving unit receives the first LLDP packet from the control device within the same SDN instance of the switch device;
the transmitting unit is further to transmit a third LLDP packet to the control device in the same SDN instance of the switch device, when the receiving unit receives an LLDP data frame from another switch device within the same SDN instance of the switch device, such that the control device learns the topology structure of the SDN corresponding to the SDN instance, and calculates flow paths;
the receiving unit is further to receive the first LLDP packet;
wherein the switch device further includes a storing unit;
the storing unit is to bind and store a port number of a port of the switch device, attribute of a packet, and the instance ID of the SDN instance on the switch device;

the receiving unit is further to receive a packet from a user side; and the processing unit is further to search for an instance ID in the storing unit, based on the attribute of the packet and port number of the port receiving the packet, when the receiving unit receives the packet from the user side, and process the packet within the SDN instance corresponding to the instance ID searched out.

12. The switch device according to claim 11, wherein the transmitting unit is further to transmit the message carrying the instance ID of the SDN instance on the switch device, which is used to inform attribute information of the switch device, such that the control device receiving the message determines the SDN instance to which the switch device belongs;

the transmitting unit is further to transmit the third LLDP packet carrying the instance ID of the SDN instance on the switch device to the control device, such that the control device receiving the LLDP packet determines the SDN instance of the switch device; and the receiving unit is further to determine whether another switch device transmitting the LLDP data frame and the switch device are in the same SDN instance, based on the instance ID carried by the LLDP data frame, when receiving the LLDP data frame.

* * * * *